United States Patent [19]
Kaihotsu et al.

[11] Patent Number: 5,661,540
[45] Date of Patent: Aug. 26, 1997

[54] LENS ARRAY AND CLOSE CONTACT TYPE IMAGE SENSOR USING THE SAME

[75] Inventors: Takahiro Kaihotsu, Fujisawa; Masami Tabata, Isehara; Nobuyoshi Tanaka, Tokyo, all of Japan

[73] Assignee: Canon Kabushiki Kaisha, Tokyo, Japan

[21] Appl. No.: 589,311

[22] Filed: Jan. 22, 1996

Related U.S. Application Data

[63] Continuation of Ser. No. 143,644, Nov. 1, 1993, abandoned.

[30] Foreign Application Priority Data

| Nov. 4, 1992 | [JP] | Japan | 4-318016 |
| Apr. 9, 1993 | [JP] | Japan | 5-105985 |
| Oct. 15, 1993 | [JP] | Japan | 5-280718 |

[51] Int. Cl.$^6$ .................................................. G02B 5/00
[52] U.S. Cl. .................................................. 355/1
[58] Field of Search .................................................. 355/1, 228

[56] References Cited

U.S. PATENT DOCUMENTS

| 3,658,407 | 4/1972 | Kitano et al. | 355/1 X |
| 3,909,109 | 9/1975 | Aurenz | 355/1 X |
| 4,215,933 | 8/1980 | Feneberg et al. | 355/50 |
| 4,373,780 | 2/1983 | Lama | 355/1 X |
| 4,462,662 | 7/1984 | Lama | 355/1 X |
| 4,590,492 | 5/1986 | Meier | 355/1 X |
| 4,623,937 | 11/1986 | Watanabe | 355/235 X |
| 4,999,648 | 3/1991 | Debesis | 355/200 |

FOREIGN PATENT DOCUMENTS

| 0002736 | 7/1979 | European Pat. Off. |
| 0257798 | 3/1988 | European Pat. Off. |
| 0508709 | 10/1992 | European Pat. Off. |
| 56-161772 | 12/1981 | Japan |
| 57-188010 | 11/1982 | Japan |
| 58-049903 | 3/1983 | Japan |
| 62-071373 | 4/1987 | Japan |

*Primary Examiner*—Fred L. Braun
*Attorney, Agent, or Firm*—Fitzpatrick, Cella, Harper & Scinto

[57] ABSTRACT

This specification discloses a lens array having a lens element body having a plurality of lens elements arranged, and an overlap limiting member provided between the lens elements of the lens element body for limiting the overlap of images by the plurality of lens elements. The specification also discusses a close contact type image sensor which uses the lens array as an optical element array for directing reflected light from an original and which has a transparent member for supporting the original, a light source for illuminating the original, and a sensor array for photoelectrically converting the image of the original.

9 Claims, 10 Drawing Sheets

LENS ARRAY AND CLOSE CONTACT TYPE IMAGE SENSOR USING THE SAME

This application is a continuation of application Ser. No. 08/143,644 filed Nov. 1, 1993, now abandoned.

BACKGROUND OF THE INVENTION

1. Field of the Invention

This invention relates to a lens array and a close contact type image sensor using the same. The lens array of the present invention is particularly suitable for use in a close contact type image sensor adapted to be in close contact with an original and to effect reading.

2. Related Background Art

Figure 14:
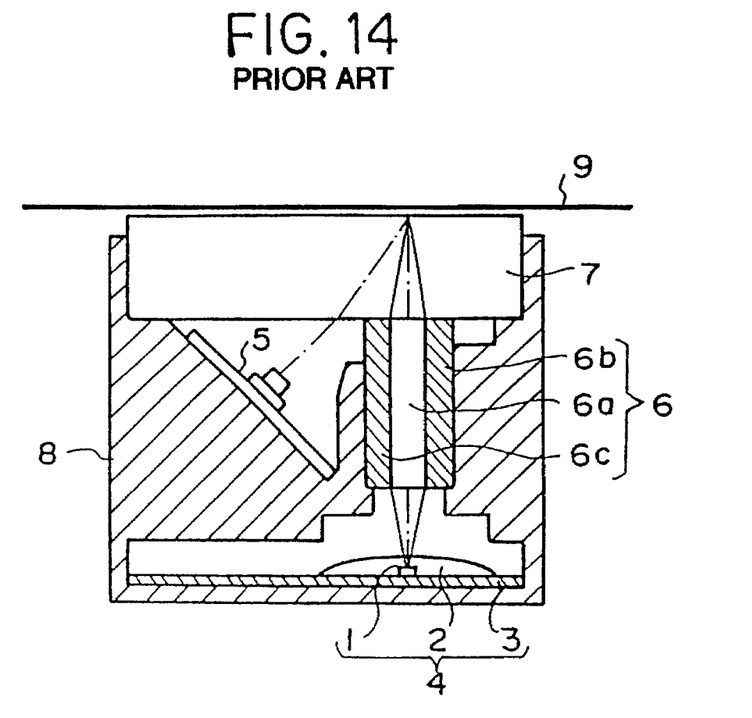
FIG. 14 is a cross-sectional view showing the structure of the close contact type image sensor of the present invention.

FIG. 14 of the accompanying drawings is a cross-sectional view showing the structure of a close contact type image sensor according to the prior art. As shown in FIG. 14, a sensor unit is comprised of a sensor module (constituting a sensor array) 4 comprising a sensor IC 1 having a plurality of pixels for effecting photoelectric conversion arranged, protective film 2 and a substrate 3 having these mounted thereon, an LED array 5 which is a light source for illuminating an original, a lens element body (constituting a lens array) 6 for forming the image of the original on the light receiving portion of the sensor, a transparent member 7 in close contact with the original 9 to support it, and a frame 8 supporting these members.

As regards the operation of the above-described close contact type image sensor, the original 9 is illuminated by the light source (LED array 5), diffused reflected light on the read line of the original is imaged on the pixel array of the sensor by the lens element body 6, the light and shade information of the original had by the reflected light, i.e., the intensity of the light, is converted into an electrical signal by the individual sensor pixels and is delivered in the main scanning direction. The relative position of the original and the sensor pixel array is then moved in the sub-scanning direction and the data delivery in the main scanning direction is repeated to thereby convert two-dimensional image information into a time-serial electrical signal.

Figure 15:
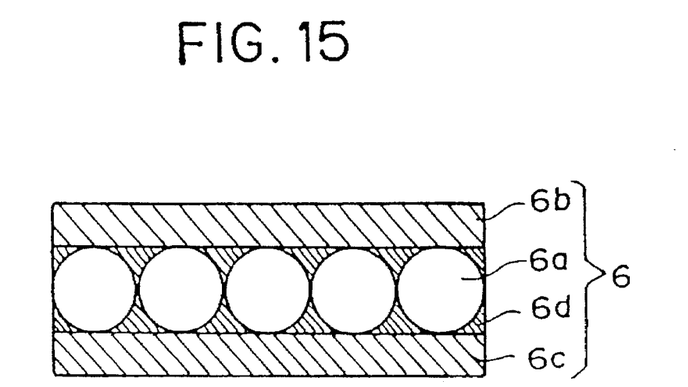
FIG. 15 shows the external appearance of a lens element array (graded index type optical fiber lens array).

As the lens element body, use can be made, for example, of one comprising a plurality of lens elements each having a refractive index distribution in a direction orthogonal to the optical axis. More specifically, use can be made of one comprising a number of optical fibers each having a refractive index distribution in a direction orthogonal to the optical axis and arranged on a straight line, and since the individual optical fibers exhibit a lens action, the lens element body as a whole acts as a small and long imaging lens. FIG. 15 of the accompanying drawings shows the opening portions of the lens element body, and is a view of the lens element body 6 as it is seen from the sensor module 4 side. In FIG. 15, the reference character 6a designates the opening portions of the lens element body, the reference characters 6b and 6c denote support plates, and the reference character 6d designates a member of resin or the like holding the lens elements.

Figure 19:
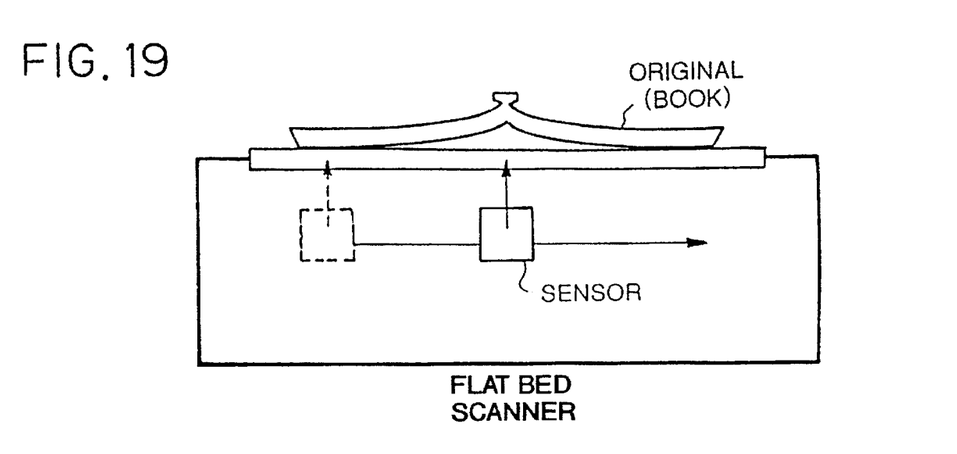
FIG. 19 shows an example of the use of a sensor having a great depth of field.

In the above-described example of the prior art, however, a lens element body, i.e., a double-eye lens, is used as the imaging lens and therefore, image overlap occurs and the combined angle of opening becomes great, and this has led to a problem that the depth of field is shallow and the quality of image is deteriorated when the original is bent or is uneven with cuts sticked thereon. Also, in a flat bed scanner or the like as shown in FIG. 19 of the accompanying drawings, it has been impossible to read a spread of a book or the like and the use of the sensor has been limited.

Figure 16A:
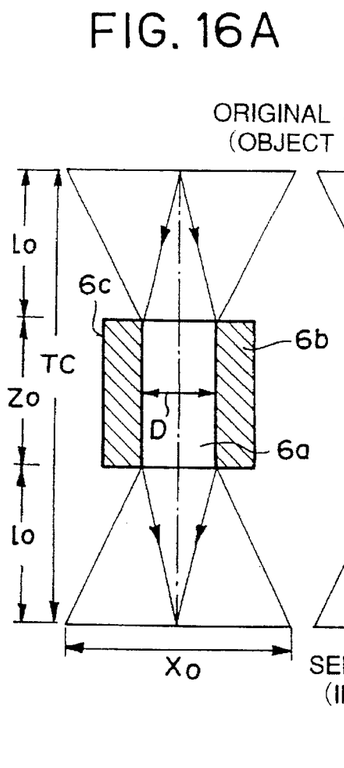
FIGS. 16A and 16B are functional illustrations of the lens element body (graded index type optical fiber lens array).
Figure 16B:
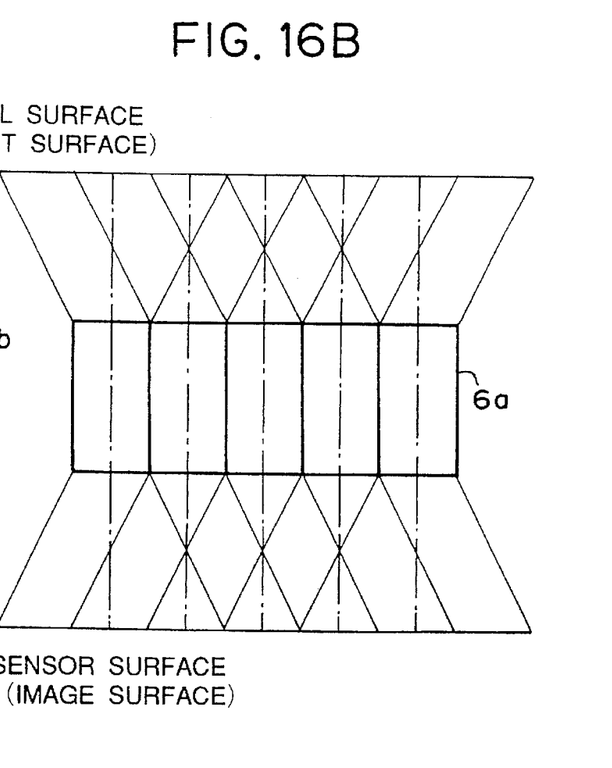
Figures 17A, 17B:
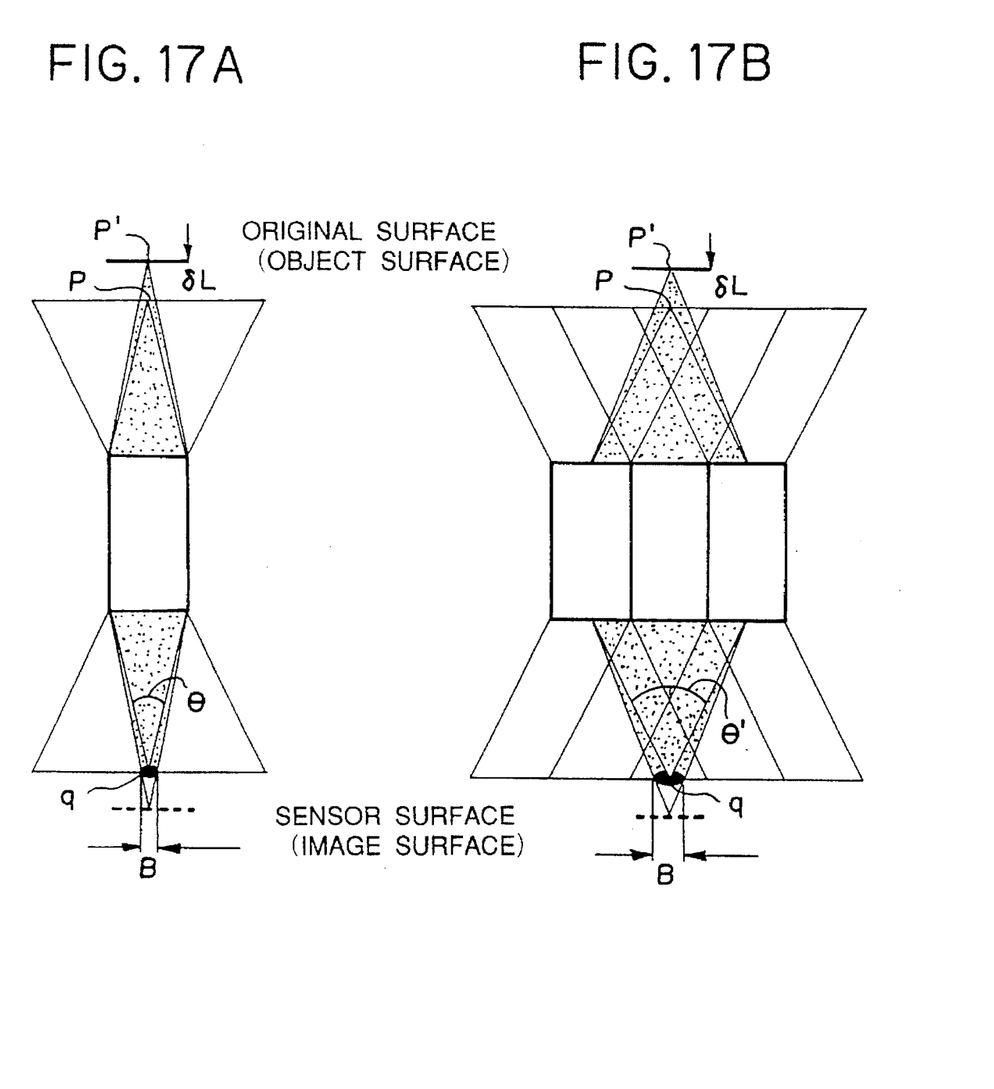
FIGS. 17A and 17B illustrate the depths of field of a lens element and a lens element body.
Figure 18:
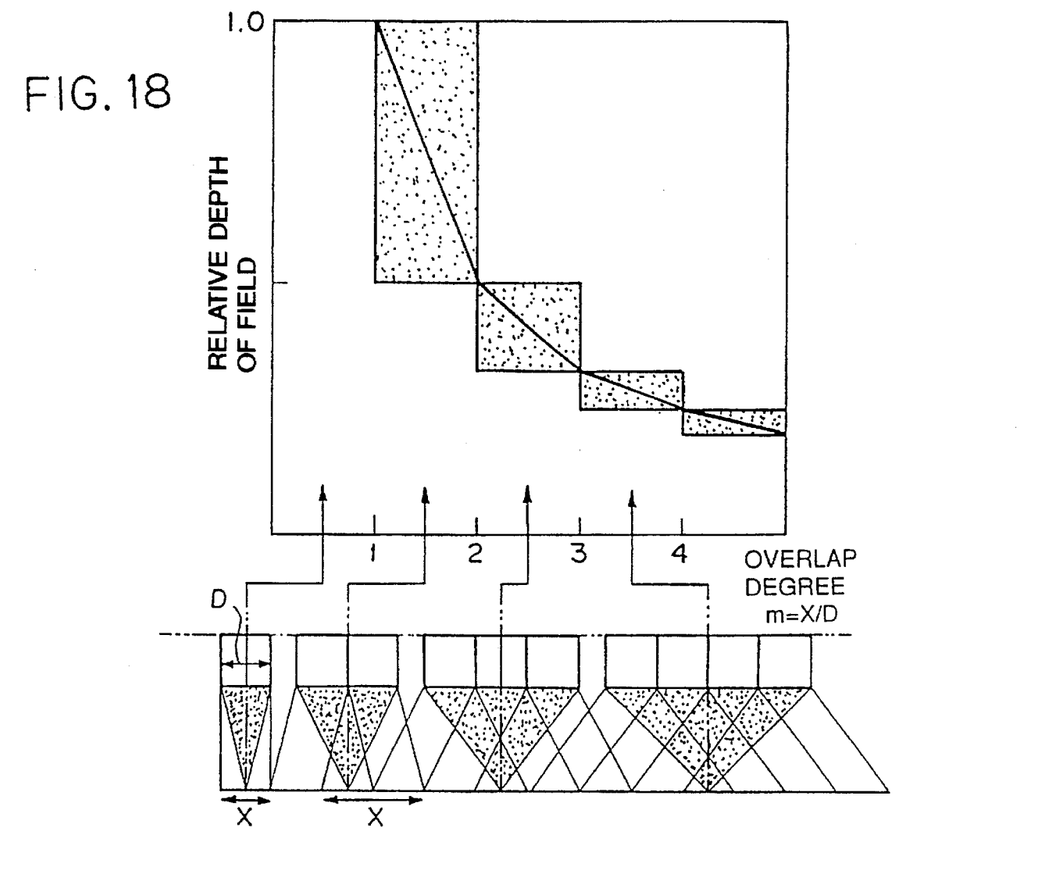
FIG. 18 is a graph showing the relation between the overlap degree m and the depth of field of the lens element body.

The manner of imaging will now be described with a grated index type optical fiber lens array as shown in FIGS. 16A and 16B of the accompanying drawings taken as an example of the lens element body. As shown in FIG. 16A, individual lens elements image erectly, at one to one magnification, an area of diameter Xo on the surface of an original on the surface of the sensor. A number of such lens elements are arranged on a straight line as shown in FIG. 16B, whereby the images of the individual lens elements are overlapped to thereby form a long image surface. The depth of field when an image is formed by the combination of the images of a plurality of lens elements is considered as follows. When as shown in FIGS. 17A and 17B of the accompanying drawings, a certain point (object point P) and its image q are supposed, a larger number of lens elements concerned in imaging leads to a result that the combined angle of opening $\theta'$ becomes greater than the angle of opening $\theta$ of each individual lens element and the blur B of the image q becomes greater relative to the movement $\delta L$ of the object point P'. That is, the depth of field of the lens element body becomes shallow, as compared with the depth of field of each individual lens element. FIG. 18 of the accompanying drawings shows the relation between the number of lens elements concerned in imaging and the depth of field. Here, a parameter which is the overlap degree $m = X/D$ is introduced by the diameter X of the image and the diameter D of each lens element to thereby represent the number of lens elements concerned in imaging. The depth of field can be improved by making the angle of opening $\theta$ of each individual lens element small, but in this case, the optical path length TC (P-q) becomes great, and when such lens element body is used in a close contact type image sensor as in the example of the prior art, the body becomes bulky. Also, the quantity of light reaching the image surface decreases remarkably and the burden applied to the light source becomes great. Further, such a lens element body having a great depth of field is expensive.

SUMMARY OF THE INVENTION

It is an object of the present invention to solve the above-noted problems peculiar to the prior art.

It is a further object of the present invention to provide a lens array and/or a close contact type image sensor having a great combined depth of field.

A lens array according to an embodiment of the present invention is provided with a lens element body comprising a plurality of lens elements arranged, and an overlap limiting member provided between the lens elements of said lens element body for limiting the overlap of images.

Also, a close contact type image sensor according to a first embodiment of the present invention is a close contact type image sensor provided with a transparent member for supporting an original, a light source for illuminating said original, an optical element array for directing reflected light from said original, and a sensor array for photoelectrically converting the directed image of the original, characterized in that the lens array of the above-described embodiment is used as said optical element array.

Also, a close contact type image sensor according to a second embodiment of the present invention is characterized in that in the close contact type image sensor of the above-described first embodiment, an overlap limiting member having a plurality of opening portions corresponding to the respective lens elements is installed between the lens element body and the sensor array so that the optical axis of each lens element and the center of each of said opening portions may coincide with each other.

Also, a close contact type image sensor according to a third embodiment of the present invention is characterized in that in the close contact type image sensor of the above-described first embodiment, said overlap limiting member has a plurality of light transmitting members corresponding to the lens elements, and the space between adjacent ones of said light transmitting members is shielded from light.

The lens array of the present invention is such that in a lens element body comprising a plurality of lens elements arranged, there is provided an overlap limiting member for limiting the overlap of the images between the lens elements, to thereby decrease the number of lens elements concerned in imaging without increasing the optical path length, that is, for example, make the overlap degree m in FIG. 18 small and improve the combined depth of field as the lens element body. The quantity of transmitted light decreases in accordance with a decrease in the number of lens elements concerned in imaging, but the rate of decrease is small as compared with a case where the angle of opening of each individual lens element is made small. Also, the close contact type image sensor of the first embodiment of the present invention uses the above-described lens array of the present invention as an imaging optical system, whereby it becomes a compact and low-cost sensor having a great depth of field.

The close contact type image sensor of the second embodiment of the present invention is such that in the close contact type image sensor of the above-described first embodiment of the present invention, an overlap limiting member having a plurality of opening portions corresponding to the respective lens elements is installed between the lens element body and the sensor array so that the optical axis of each lens element and the center of each of said opening portions may coincide with each other, to thereby suitably set the position of each of the opening portions of the overlap limiting member (the position between the lens element body and the sensor array) and the diameter of each opening portion, thereby controlling the overlap of images so as to become small and improving the depth of field.

Also, the close contact type image sensor of the third embodiment of the present invention is such that in the close contact type image sensor of the above-described first embodiment of the present invention, said overlap limiting member has a plurality of light transmitting members corresponding to the lens elements and the space between adjacent one of said light transmitting members is shielded from light to thereby control the overlap of images between the lens elements so as to become small and improve the depth of field, as in the close contact type image sensor of the above-described second embodiment of the present invention.

DETAILED DESCRIPTION OF THE PREFERRED EMBODIMENTS

Embodiments of the present invention will hereinafter be described in detail with reference to the drawings.

(First Embodiment)

Figure 1:
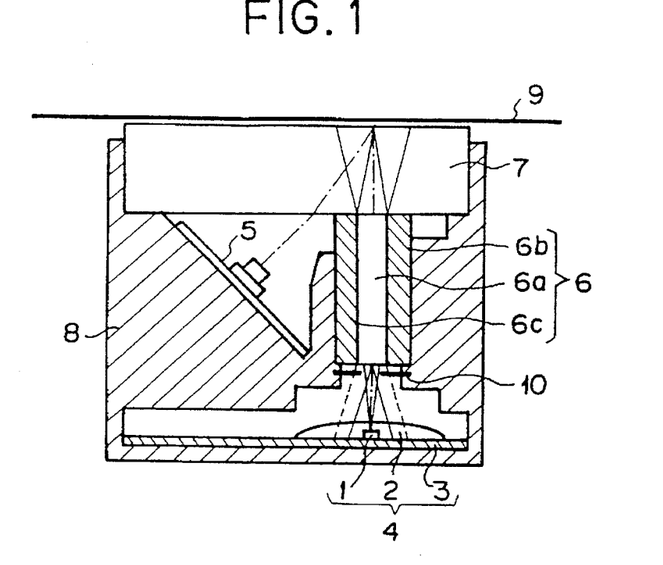
FIG. 1 is a cross-sectional view of a first embodiment of the close contact type image sensor of the present invention.
Figure 2A:
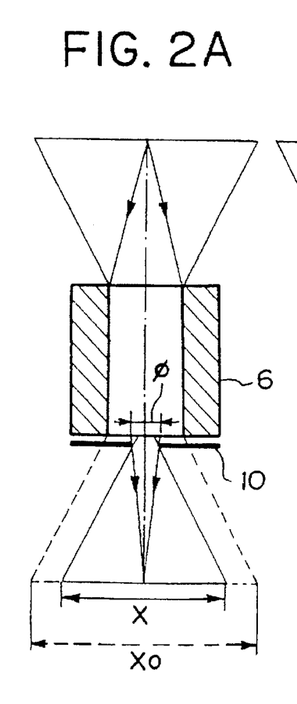
FIGS. 2A and 2B are an enlarged view and a functional illustration, respectively, of an overlap limiting member in FIG. 1.
Figure 2B:
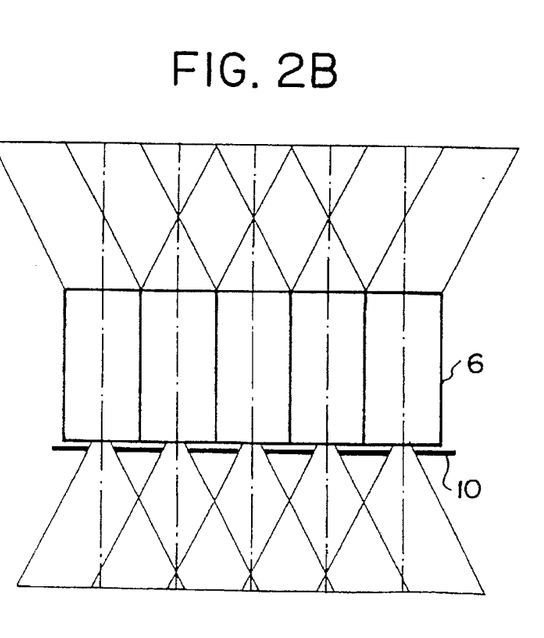
Figure 3:
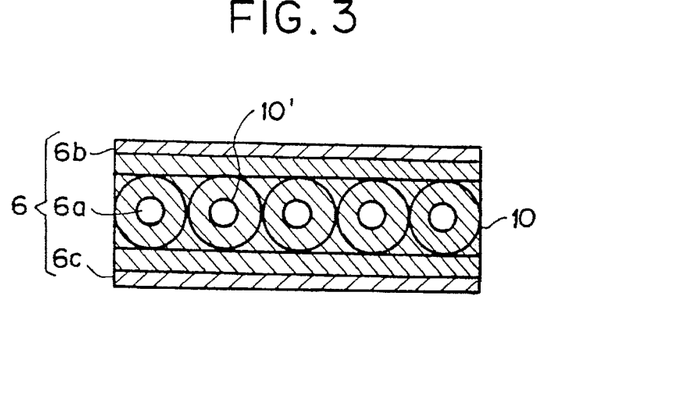
FIG. 3 shows the external appearance of the overlap limiting member.

FIG. 1 is a cross-sectional view of a first embodiment of the close contact type image sensor of the present invention. FIG. 2A is a sub-scanning cross-sectional view of the portion of the first embodiment of the present invention in which an overlap limiting member is provided, and FIG. 2B is a main scanning cross-sectional view of the same portion. In FIGS. 1, 2A and 2B, the same constituent members as the constituent members of FIG. 14 are given the same reference characters and need not be described. As shown in FIGS. 1, 2A and 2B, in the present embodiment, an overlap limiting member 10 is provided in the sensor side opening portion of a lens element body 6 comprising a plurality of erect one-to-one magnification imaging type lens elements arranged (in the present embodiment, the lens element body 6 and the overlap limiting member 10 together constitute a lens array) to limit the overlap of images between the lens elements and make the imaging diameter small, to thereby make the combined angle of opening of the lens array small and improve the combined depth of field. FIG. 3 shows the external appearance of the overlap limiting member. In this case, the overlap limiting member is of a shape in which light transmitting windows 10' of a diameter φ are formed in a film-like opaque member at a pitch equal to a lens pitch D, and the image diameter X is controlled by the size of the window diameter φ.

The overlap limiting member may be sticked on the lens element body or directly printed on the lens, or may be provided on a frame 8 side. However, the coefficient of thermal expansion of the frame 8 needs be adjusted to that of the lens element body 6, so that the relative position of the lens element body 6 and the frame 8 may not be varied by temperature. The shape of the frame may be any shape effective to limit the overlap of images between the lens elements.

Figure 4:
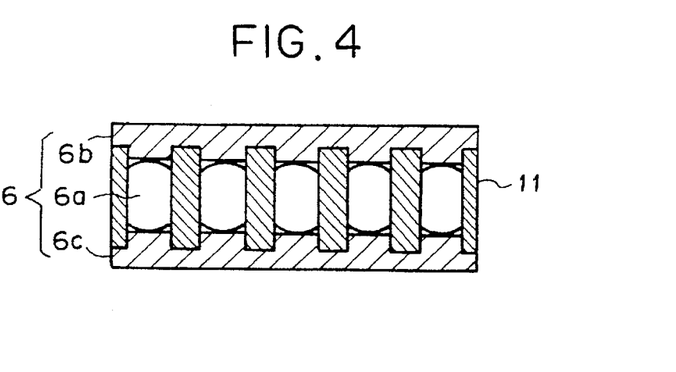
FIG. 4 shows the external appearance of an overlap limiting member of another construction.

Also, the shape of the overlap limiting member may be any shape effective to limit the overlap of images between the lens elements. FIG. 4 shows another shape of the overlap limiting member in this case, the effect of an improvement in the depth of field is obtained only in the main scanning direction.

(Second Embodiment)

Figure 5:
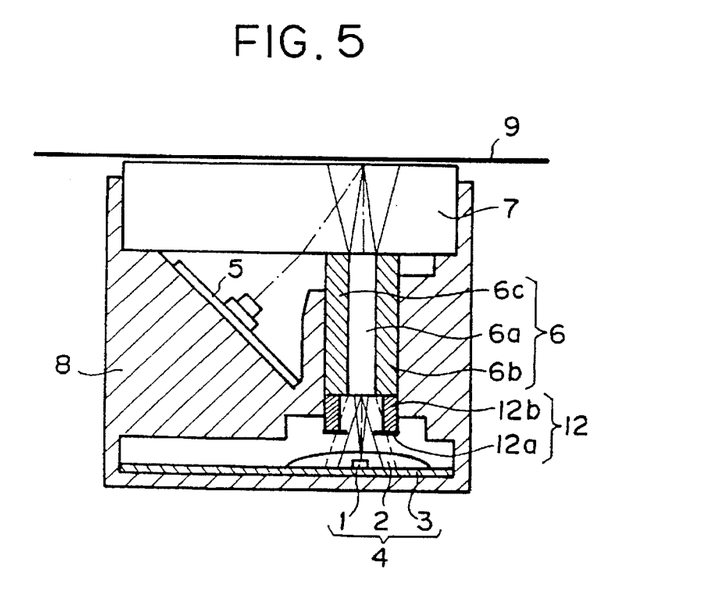
FIG. 5 is a cross-sectional view of a second embodiment of the close contact type image sensor of the present invention.

FIG. 5 is a cross-sectional view of a second embodiment of the close contact type image sensor of the present invention. In FIG. 5, the reference character 12a designates an overlap limiting member, and the reference character 12b denotes a spacer for prescribing the position thereof. (In the present embodiment, the lens element body 6, the overlap limiting member 12a and the spacer 12b together constitutes a lens array.) In the present embodiment, in contrast with the construction of the first embodiment, the overlap limiting member is provided with a predetermined distance t relative to the lens element body with the spacer interposed therebetween. The other members are the same as the constituent members of FIG. 1 and therefore are given the same reference characters and need not be described.

Figure 6A:
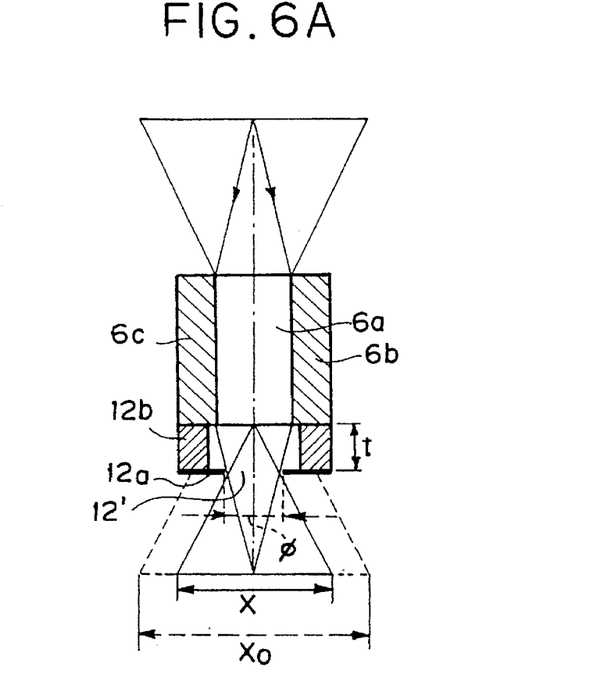
FIGS. 6A and 6B are an enlarged view and a functional illustration, respectively, of an overlap limiting member in FIG. 5.
Figure 6B:
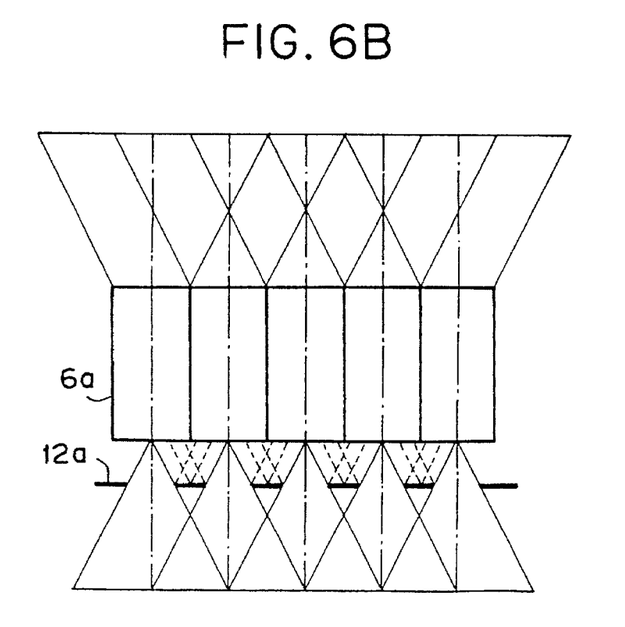
Figure 7:
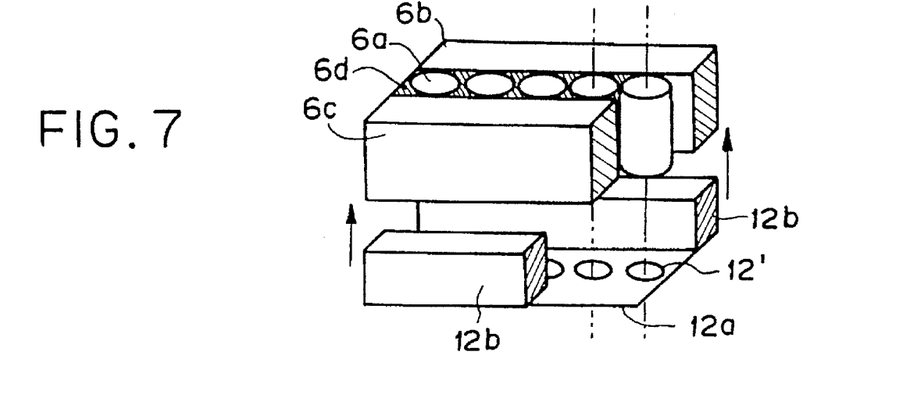
FIG. 7 is a pictorial perspective view of the overlap limiting member.
Figure 8:
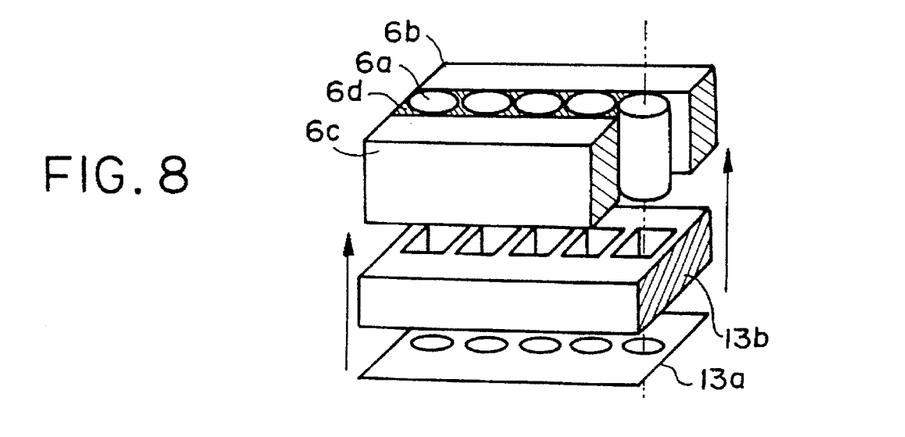
FIG. 8 is a pictorial perspective view of an overlap limiting member of another construction.
Figure 9:
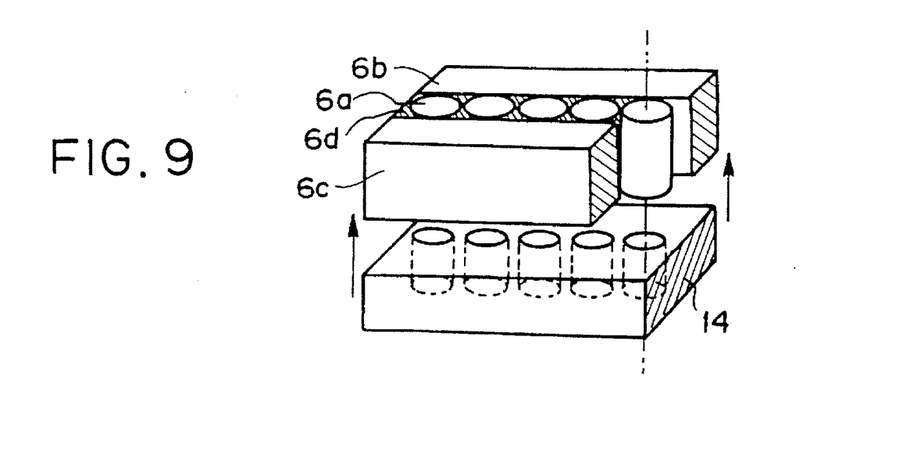
FIG. 9 is a pictorial perspective view of an overlap limiting member of still another construction.

FIG. 7 is a pictorial perspective view of the overlap limiting member. As shown by FIG. 7, the fibers are contiguously arranged. The limitation of the overlap of images is effected by the diameter $\phi$ of windows 12' and the thickness t of the spacer, as shown in FIGS. 6A and 6B. If the overlap of images is limited by the diameter $\phi$ of the windows, the combined angle of opening of the lens element body will become small and the quantity of light transmitted to the image surface will decrease and therefore, the limitation by the thickness t of the spacer is more effective, but in this case, if the thickness t of the spacer is made too great, the images of the adjacent lens elements will leak in, and the effect of an improvement in the depth of field will be lost. So, if as shown in FIG. 8, a spacer 13b is made into a grating-like configuration, the leaking light will be intercepted, whereby the effect of an improvement in the depth of field will become great. Further, the construction of FIG. 9 in which the spacer and the overlap limiting member are made integral with each other is possible. Furthermore, the overlap limiting member may be directly made in the sensor frame. As in the first embodiment, the coefficient of thermal expansion of the overlap limiting member needs be adjusted to that of the lens element body, so that the position thereof relative to the lens element body may not be varied by temperature. Also, the shape of the windows of the overlap limiting member may be any shape effective to limit the overlap of images.

(Third Embodiment)

Figure 10:
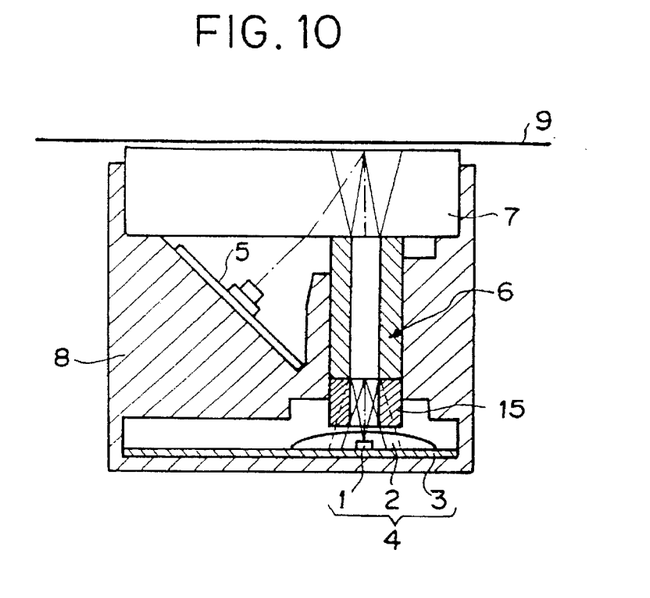
FIG. 10 is a cross-sectional view of a third embodiment of the close contact type image sensor of the present invention.
Figure 12:
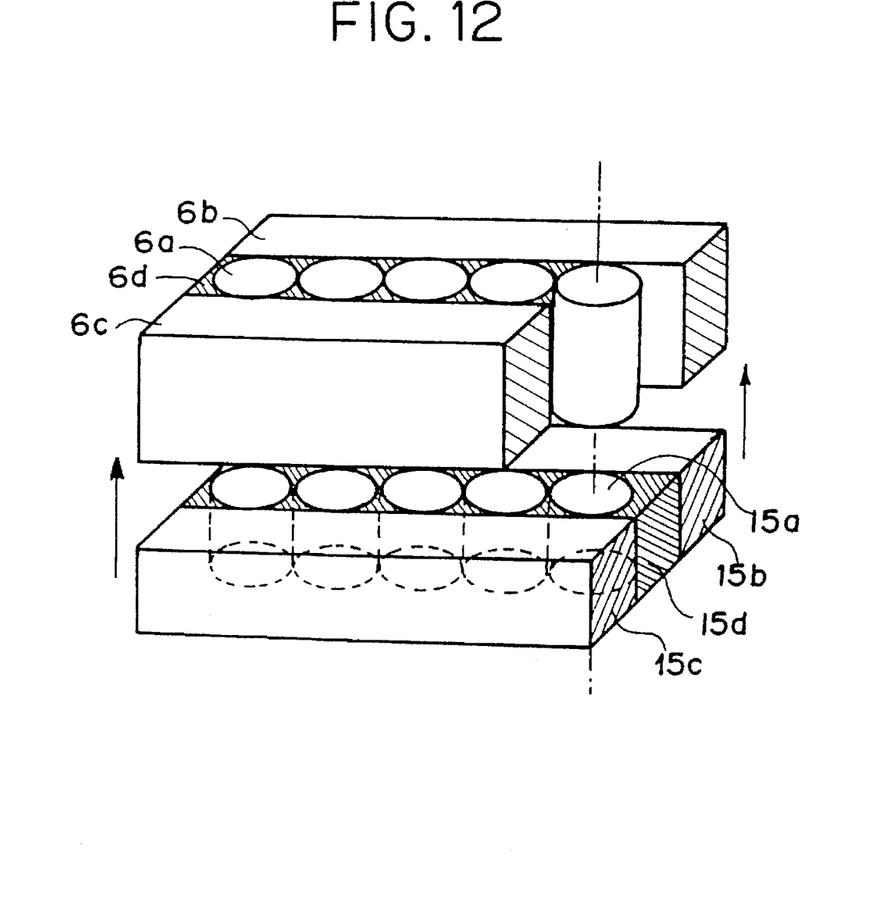
FIG. 12 is a pictorial perspective view of the overlap limiting member.

FIG. 10 is a cross-sectional view of a third embodiment of the close contact type image sensor of the present invention. FIG. 12 is a perspective view showing the construction of a lens array. In FIGS. 10 and 12, the reference numeral 15 designates an overlap limiting member. In these figures, the same constituent members as those in FIG. 14 are given the same reference characters and need not be described. The overlap limiting member 15 is of the same diameter as the lens element body 6 (graded index type optical fiber array comprising a number of optical fibers each having a refractive index distribution in a direction orthogonal to the optical axis and arranged on a straight line), and is comprised of outer frames 15b, 15c and a light transmitting member 15a having its outer peripheral portion shielded from light, and the light transmitting member is manufactured with the step of endowing it with a refractive index distribution omitted in the manufacturing process of an optical fiber lens array. The reference character 6a denotes lens elements, and the reference characters 6b and 6c designate outer frames. Such an overlap limiting member 15 is equal in its outside dimensions inclusive of the light transmitting member to the lens element body, and can be mounted on each lens element at 1:1 without any pitch deviation. Also, the materials of the members are the same and therefore, no pitch deviation is caused for any variation in temperature. Also, manufacture may be made with the light transmitting member 15a made coincident with the outer frames 6b, 6c of the lens element body.

Figure 11A:
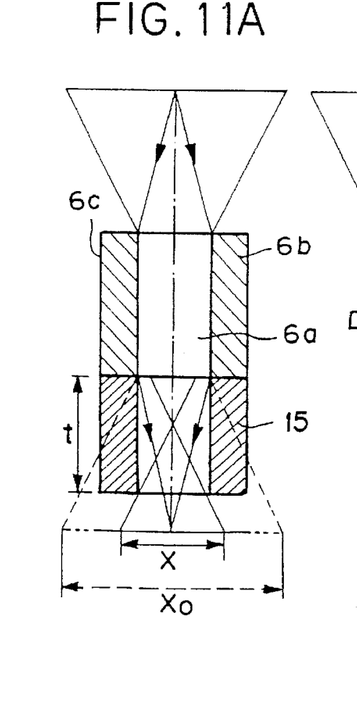
FIGS. 11A and 11B are an enlarged view and a functional illustration, respectively, of an overlap limiting member in FIG. 10.
Figure 11B:
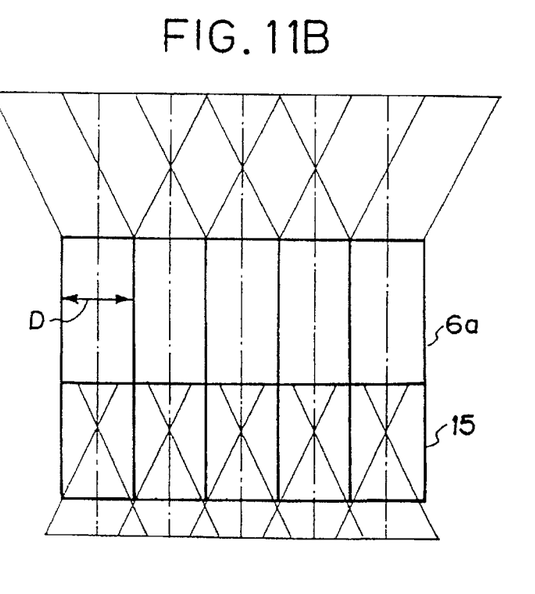

That part of the light transmitted through the lens elements which spreads outwardly is absorbed by the inner wall of the overlap limiting member 15 to thereby limit the overlap of images. The overlap limiting member 15 has its thickness t varied as shown in FIGS. 11A and 11B to thereby control the radius X of images and also limit the overlap of images. Also, since the diameter of the light transmitting windows of the overlap limiting member is equal to the diameter of the lens elements, the decrease in the quantity of light transmitted to the image surface is small.

Figure 13:
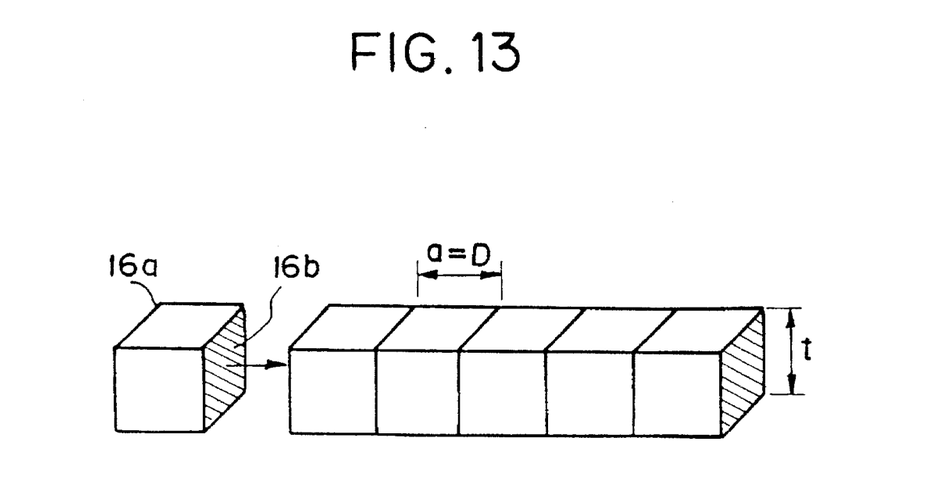
FIG. 13 is a pictorial perspective view of an overlap limiting member of another construction.

FIG. 13 is a perspective view showing another construction of the overlap limiting member. In order to achieve a purpose similar to that of the overlap limiting member of FIG. 10, this overlap limiting member comprises a number of blocks of light transmitting members having a shorter side a equal to the diameter D of the lens elements and coupled together in a straight line form by a light intercepting adhesive agent, and the shorter side a is made coincident with the diameter D of the lens elements and the blocks are installed in the opening portions of the lens element body, whereby the overlap of images between the lens elements is controlled.

As described above, according to the lens array and close contact type image sensor of the present invention, an overlap limiting member is provided between lens elements, whereby the combined angle of opening of the lens array can be made small and the combined depth of field can be improved. Accordingly, the image sensor becomes difficult to be affected by the unevenness or floating of an original and the application thereof to a flat bed scanner or the like becomes possible, and the range of use of the sensor can be widened.

Also, the sensor can be made lower in cost and more compact than when use is made of an expensive lens array having a great optical path length, and conventional parts can be employed and this leads to the standardization of parts which in turn leads to the possibility of reducing the manufacturing cost.

Also, according to the close contact type image sensor of the present invention, an overlap limiting member having a plurality of opening portions corresponding to lens elements is installed between a lens element body and a sensor array so that the optical axis of the lens elements may coincide with the center of each of said opening portions, whereby the overlap of images between the lens elements can be limited, and thus, as compared with a case where use is made of a lens array of the conventional long focus type, there can be realized a close contact type image sensor which is compact and low in cost as well as great in depth of field.

Also, according to the close contact type image sensor of the present invention, the overlap limiting member has a plurality of light transmitting members corresponding to lens elements and the space between adjacent ones of the light transmitting members is shielded from light, whereby the overlap of images between the lens elements can be limited and thus, as compared with a case where use is made of a lens array of the conventional long focus type, there can be realized a close contact type image sensor which is compact and low in cost as well as great in depth of field.

What is claimed is:

1. A lens array comprising:

a lens element body comprising a plurality of cylindrical lens elements, each lens element having an inlet end, an outlet end, and a refractive index distribution in a direction orthogonal to the optical axis thereof, the lens elements being arranged contiguously, whereby images of the individual lens elements are overlapped to form a combined image surface; and overlap masking means arranged near the outlet ends of the lens elements for improving combined depth of field of an image formed by said lens array by masking the overlap of images formed by said plurality of lens elements so as to limit an overlap amount of image close to but more than zero.

2. A close contact type image sensor comprising a transparent member for supporting an original, a light source for illuminating said original, an optical element array for directing reflected light from said originals, and a sensor array for photoelectrically converting the directed image of the original, characterized in that said optical element array is a lens array comprising a lens element body comprising a plurality of cylindrical lens elements, each lens element having an inlet end, an outlet end, and a refractive index distribution in a direction orthogonal to the optical axis thereof, the lens elements being arranged contiguously, whereby images of the individual lens elements are overlapped to form a combined image surface, and an overlap masking member arranged near the outlet ends of said lens elements of said lens element body for improving combined depth of field of an image formed by said lens elements by masking the overlap of images formed by said plurality of lens elements so as to limit an overlap amount of image close to but more than zero.

3. A close contact type image sensor according to claim 2, wherein an overlap limiting member having a plurality of opening portions corresponding to said lens elements is installed between said lens element body and said sensor array so that the optical axis of each of said lens elements may coincide with the center of each of said opening portions.

4. A close contact type image sensor according to claim 2, wherein said overlap limiting member has a plurality of light transmitting members corresponding to said lens elements, and the space between adjacent ones of said light transmitting members is shielded from light.

5. A close contact type image sensor according to claim 4, wherein each of said light transmitting members comprises an optical fiber not having a refractive index distribution in the direction orthogonal to the optical axis.

6. A lens array comprising:

a lens element body comprising a plurality of cylindrical focus lens elements, each lens element having an inlet end, an outlet end, and a refractive index distribution in a direction orthogonal to the optical axis thereof, the lens elements being arranged contiguously, whereby images of the individual lens elements are overlapped to form a combined image surface; and overlap masking means arranged near the outlet ends of the focus lens elements for improving combined depth of field of an image formed by said focus lens elements by masking the overlap of images focused by said plurality of focus lens elements so as to limit an overlap amount of image close to but more than zero.

7. A lens array according to claim 6, wherein said overlap limiting means comprises a light shielding member.

8. A lens array comprising:

a lens element body comprising a plurality of cylindrical lens elements, each lens element having an inlet end, an outlet end, and a refractive index distribution in a direction orthogonal to the optical axis thereof, the lens elements being arranged contiguously, whereby images of the individual lens elements are overlapped to form a combined image surface; and depth-of-field improving means arranged near the outlet ends of said lens elements for improving combined depth of field of an image formed by said plurality of lens elements by masking the overlap of images formed by said plurality of lens elements so as to limit an overlap amount of images close to but more than zero.

9. A lens array according to claim 8, wherein said depth-of-field improving means comprises a light shielding member.

* * * * *